United States Patent [19]

Hidata

[11] Patent Number: 4,845,333
[45] Date of Patent: Jul. 4, 1989

[54] WELDING METHOD AND APPARATUS

[76] Inventor: Masato Hidata, 5-830 Ooi, Tsukui-machi, Tsukui-gun, Kanagawa-ken, Japan

[21] Appl. No.: 160,385

[22] Filed: Feb. 25, 1988

[30] Foreign Application Priority Data

Feb. 26, 1987 [JP] Japan ............................ 62-27650[U]
Mar. 20, 1987 [JP] Japan ............................ 62-41300[U]
Aug. 24, 1987 [JP] Japan ............................ 62-209990

[51] Int. Cl.$^4$ ............................................. B23K 11/10
[52] U.S. Cl. .................................. 219/117.1; 219/80; 219/86.24
[58] Field of Search ................... 219/86.25, 80, 86.24, 219/86.23, 117.1

[56] References Cited

U.S. PATENT DOCUMENTS 1,970,941  8/1934  Paugh ................................ 219/80
2,464,839  3/1949  Fairfield ........................ 219/86.25

Primary Examiner—Clifford C. Shaw
Attorney, Agent, or Firm—Cushman, Darby & Cushman

[57] ABSTRACT

Disclosed is an electric welding method and apparatus using resilient means such as springs for supporting a work to be welded. The work can be set at a desired level at which required welding is to be effected, by yieldingly compressing the springs with an upper electrode on the work until the work has been lowered to the desired level. If the work is thick or stiff, the work can be lowered simply by pushing down the work with the upper electrode against the resilient force of the springs. If the work is thin or easy to bend or deform, the work must be lowered by pulling down the work table and the work together with the aid of an appropriate pull-down piston-and-cylinder. Exact positioning of the work and satisfactory welding are assured despite the simple positioning device.

5 Claims, 10 Drawing Sheets

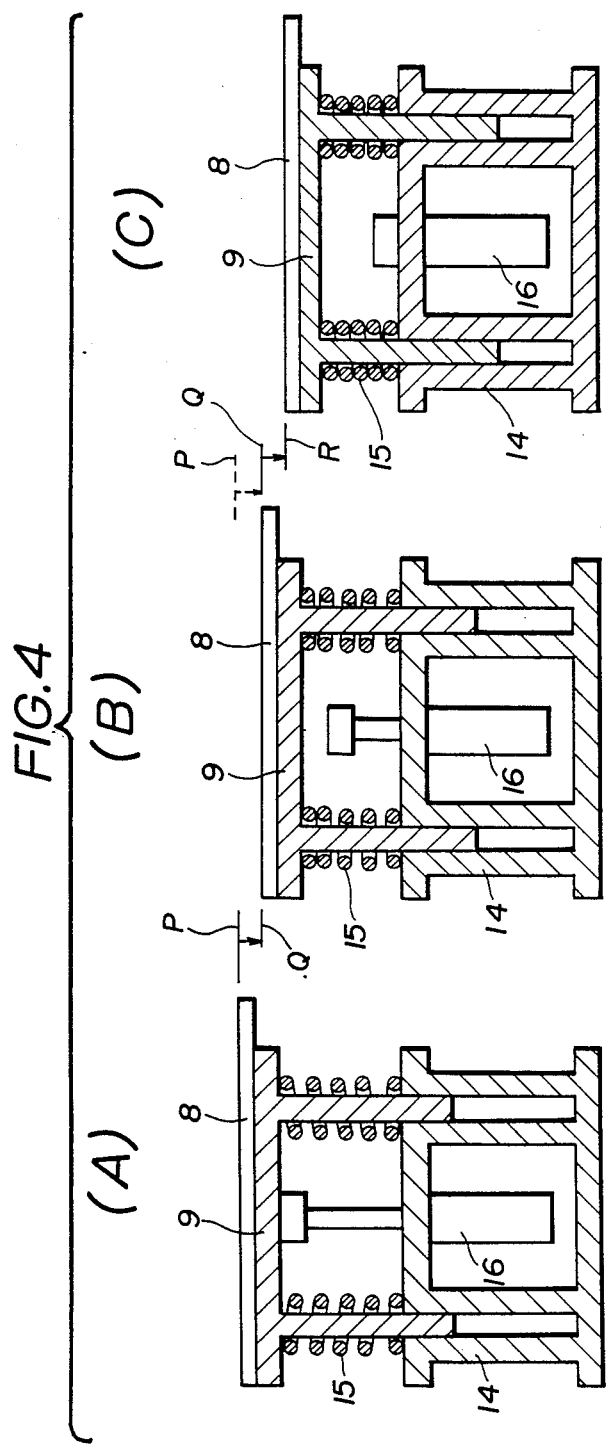

WELDING METHOD AND APPARATUS

BACKGROUND OF THE INVENTION

1. Field of the Invention

The present invention relates to a welding method and apparatus, and particularly to an electric welding method and apparatus using electrodes to weld a work which is sandwiched therebetween.

2. Description of the Prior Art

In welding a work it is moved left to right or vice versa along the X-axis, back and forth or vice versa along the Y-axis and up and down and vice versa, along the Z-axis until it has been put in the right position with respect to the electrodes. For the purpose of putting the work in a desired position at which required welding is effected, a servo motor or hydraulic motor is used. Usually a servo motor is used because it can put a workpiece exactly in a desired position with accuracy. A servo control for positioning a work with respect to the electrodes of a welding apparatus, permits quick and easy positioning of the work, accordingly improving the efficiency with which required welding is effected. However, it has the following disadvantages and demerits: (1) a servo motor is relatively expensive; (2) uses a high-level technical art, and accordingly its maintenance requires expert knowledge and skillfulness; and (3) nearmiss is often caused: a work is put in a desired position, and then the electrodes are moved to reach the work, and therefore sometimes the electrodes push and put the work away from the desired position. If the work is not firm or still enough to resist the push of the electrodes against the work, it may be bent or deformed. Then, the electrodes cannot fully contact the work, and poor welding will result.

SUMMARY OF THE INVENTION

One object of the present invention is to provide an electric welding method and apparatus which permits the exact vertical positioning of a work with respect to the electrodes without recourse to any high-level technical art.

Another object of the present invention is to provide an electric welding method and apparatus which requires no expert knowledge and skillfulnes in its operation and maintenance, still assuring perfect welding.

Still another object of the present invention is to provide a welding method and apparatus which prevents any deviation of a work from a desired position as would be caused by pushing the work with the electrodes after having put the work in the desired position, thus assuring welding at the next position in the work, and preventing unsatisfactory welding caused by poor contact between the work and the electrodes. To attain these objects according to a first embodiment a welding method for welding a work to be welded at an adjusted level between the upper and lower electrodes of a welding set on a base is provided, characterized in that it comprises the steps of: putting, temporarily in the course of positioning the work vertically, the work at a level above a desired level at which the welding is effected; lowering and positioning the work and the upper electrode together at the desired level at which the lower electrode is positioned and performing required welding on the work.

According to a second embodiment, a welding method for welding a work to be welded at an adjusted level between the upper and lower electrodes of a welding set on a base is provided, characterized in that it comprises the steps of: putting, temporarily in the course of positioning the work vertically, the work at a level above a desired level at which the welding is effected; lowering and positioning the work and the upper electrode together at the desired level at which the lower electrode is positioned; and performing required welding on the work, and that in positioning the work vertically, a lift plate is used to lower the work down to the desired level as high as the lower electrode particularly in case that the work is thin or easy to bend or flex.

According to a third embodiment a welding apparatus is provided which comprises a base, a welding set having movable upper electrode and stationary lower electrode, a work table for supporting a work to be welded, and means for positioning the work on the work table at a given level, characterized in that: said work positioning means comprises a spring for supporting the work table, said spring having a primary capability of positioning the work somewhat above the desired level, never permitting the work to descend below the desired level, when the spring is yieldingly compressed to balance the weight of the work, and a secondary capability of allowing the work to descend to the desired position as high as the stationary lower electrode when extra force is applied to the spring, thus permitting the fine level adjustment of the work.

According to a fourth embodiment a welding apparatus is provided which comprises a base, a welding set having movable upper electrode and stationary lower electrode, a work table for supporting a work to be welded, and means for positioning the work on the work table at a given level, characterized in that: said work positioning means comprises a spring for supporting the work table, a lift cylinder and a lift plate operatively connected both to the lift cylinder and to the spring for transmitting the vertical movement of the lift plate to the work table, said lift cylinder having a primary capability of positioning the work at a level above the desired level, and said spring on the lift plate having a secondary capability of allowing the work to descend from the level to the desired level as high as the stationary lower electrode, thus permitting the fine level adjustment of the work.

According to a fifth embodiment a welding apparatus which comprises a base, a welding set having movable upper electrode and stationary lower electrode, a work table for supporting a work to be welded, and means for positioning the work on the work table at a given level, characterized in that: said work positioning means comprises a spring for supporting the work table, a lift cylinder and a lift plate operatively connected both to the lift cylinder and to the spring for transmitting the vertical movement of the lift plate to the work table, said lift cylinder having a primary capability of positioning the work at a level above the desired level; and that said work positioning means further comprises a pulling-down cylinder having a secondary capability of allowing the work to descend from the said level to the desired level as high as the stationary lower electrode 5 by pulling down the work table against the spring, thereby permitting the fine level adjustment of the work.

In operation the lower electrode is set at a desired level at which welding is effected on the work, and then the work is raised at a level which is higher than the desired level. The upper electrode is lowered down to the desired level, and at the same time the work is lowered down to the desired level, where the work is sandwiched between the upper and lower electrodes, thereby permitting the work to be subjected to electric welding.

In case that the work is thin, and is easy to bend or deform when a force is applied thereto, the lift plate is used to lower the work so as to soften the impact which otherwise, would be caused by the upper electrode when the work and the upper electrode together descent toward the desired level.

Use is made of the pull-down cylinder to lower the work from a level which is higher than the desired level, against the resilient force of the spring until the work has reached the desired level.

Other objects and advantages of the present invention will be understood from the following description of preferred embodiments, which are shown in the accompanying drawings:

FIG. 4 shows, in section, how a work table and associated members change their positions vertically;

FIGS. 1 to 9 show a welding apparatus according to the first embodiment of the present invention. The welding apparatus is generally indicated at 1, and its base is indicated at 2.

Figure 1:
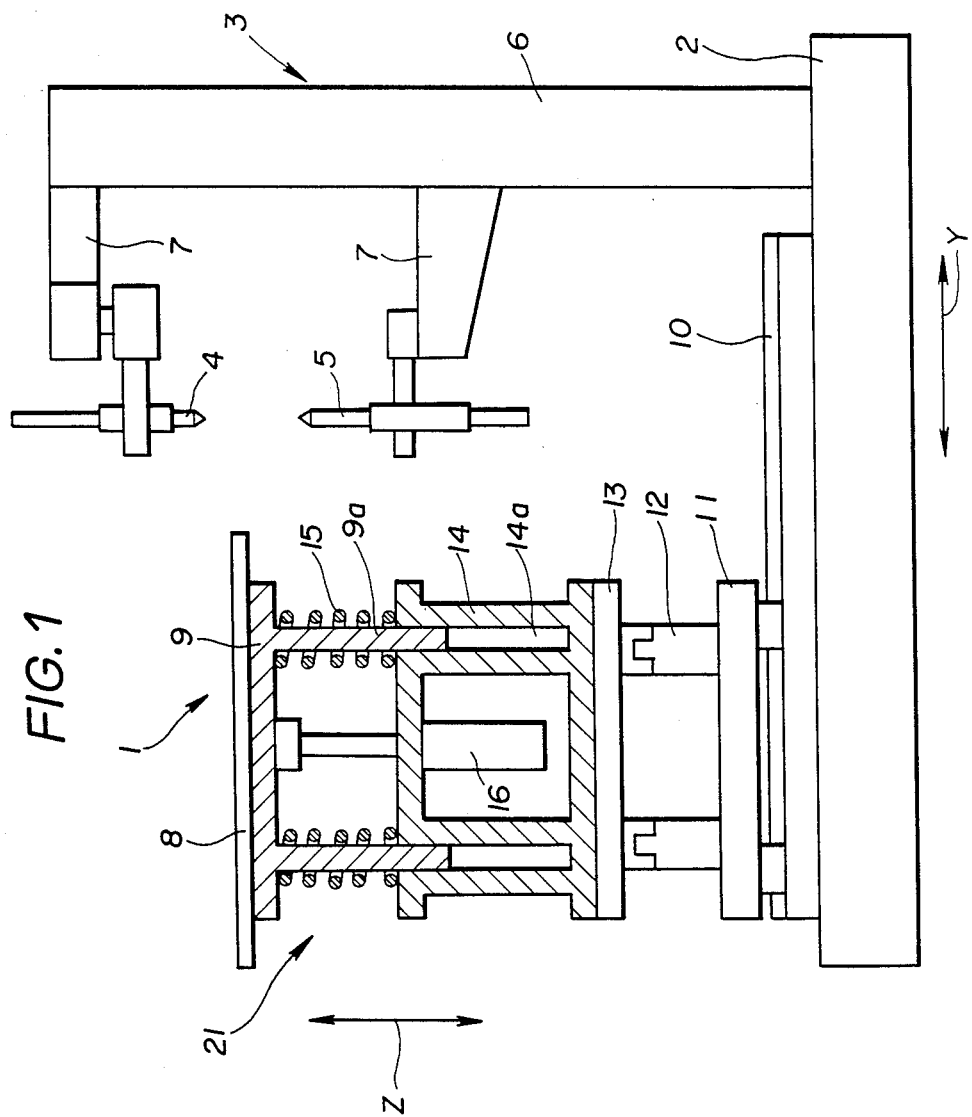
FIG. 1 is a side view of a welding apparatus according to the first embodiment of the present invention, showing the state at which the vertical positioning is not started.

A welding set 3 is arranged at one end of the base 2. It comprises an upright post 6, having upper and lower arms 7, and a movable upper electrode 4 and a stationary lower electrode 5 fixed to the upper and lower arms 7 of the upright post 6. The upper electrode 4 can be raised apart from the lower electrode 5 and be lowered close to the lower electrode 5 by any drive means appropriate for the purpose.

The work table 9 stands on the end of the base opposite to the welding set 3, supporting a work 8 to be welded.

The work table 9 can be driven leftwards and rightwards along the X-axis, back and forth along the Y-axis and up and down along the Z-axis, thereby putting the work table at a desired position at which required welding is effected.

Specifically, means for driving the work table 9 back and forth along the Y-axis is constituted by rails 10 laid on the base 2 along the Y-axis, a movable flat surface 11 on the rails 10 and drive-and-control means (not shown.) Likewise, means for driving the work table 9 leftwards and rightwards along the X-axis is constituted by rails 12 laid on the movable flat surface 11 of the Y-axis driving means, a movable flat surface 13 on the railes 12 and drive-and-control means (not shown).

The structure described so far is well known in the prior art. The central features of the present invention resides in the structure which is capable of driving the work table 9 up and down along the Z-axis in a well controlled manner. Specifically, it comprises a work table supporting unit 14 having cylindrical holes 14a for accepting the upright legs 9a of the work table 9, and resilient members such as springs 15, which are put between the flat top of the work table 9 and the flat top of the work table supporting unit 14, thereby raising and holding the flat top of the work table 9 at a level P higher than a desired level R as high as the lower electrode 5. The resilient means may be yieldingly compressed so that a work 8 on the top of the work table 9 may be lowered and held at the desired level R. Specifically, the springs 15 are yieldingly compressed by the weight of the work 8 when it is put on the work table 9, thus permitting the work 8 to descend to a level Q somewhat higher than the desired level R when the resilient force of the compressed spring balances the gravity force of the work 8 (referred to as primary capability of the spring). The so compressed spring 15 can be still compressed when a force is applied thereto, thereby permitting the work to descend and stay at the desired level R, (referred to as secondary capability of the spring). In other words, the resilience of the spring is strong enough to put the work 8 at a level somewhat higher than the desired level R when the resilient force of the spring 15 balances the gravity force of the work.

A lift cylinder 16 is provided to the work table supporting unit 14 for the purpose of facilitating the placement of a work 8 on the flat top of the work table 9. Also, the lift cylinder 16 is useful in controlling the level of the work in repositioning in the X and Y directions lest the work should strike against the P7 upper or lower electrode.

Figure 8:
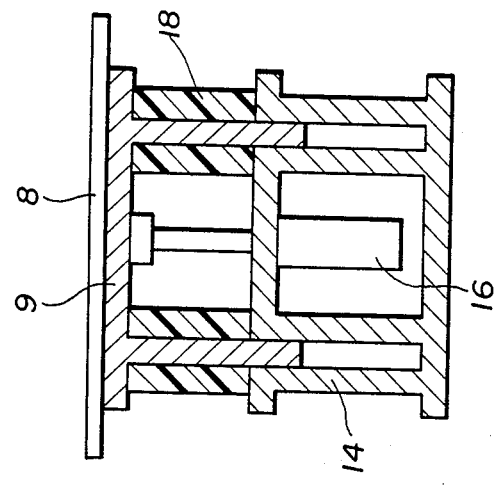
FIG. 8 shows, in section, a work table having urethane foam supports in place of springs.
Figure 7:
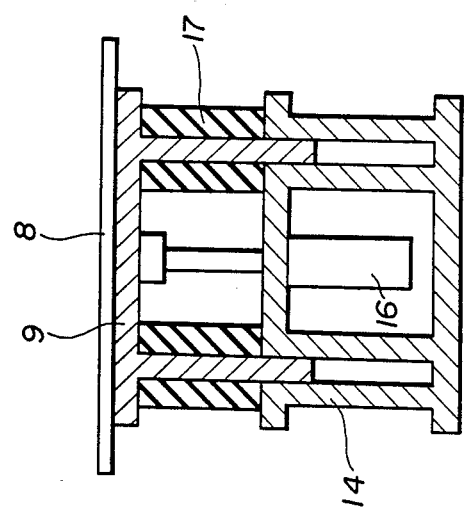
FIG. 7 shows, in section, a work table having rubber supports in place of springs.
Figure 9:
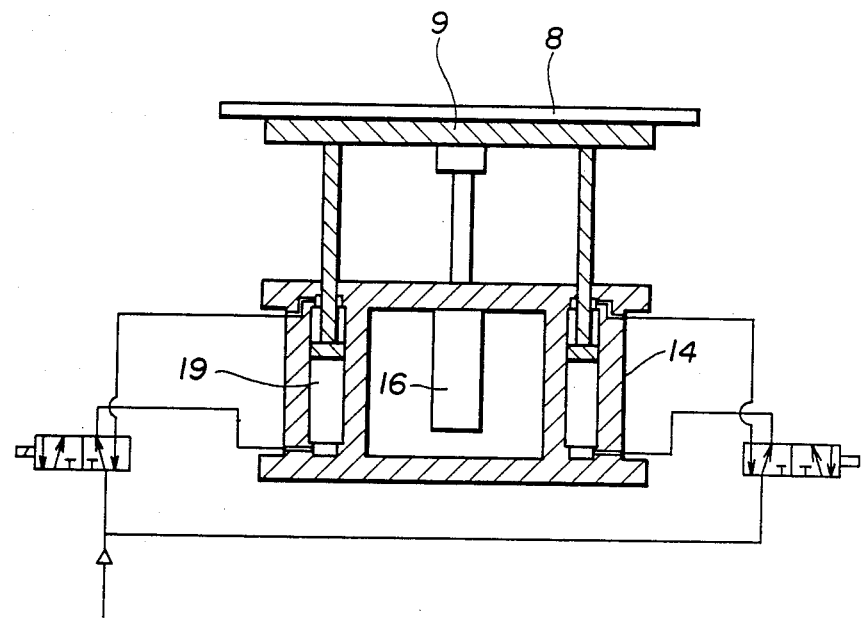
FIG. 9 shows, in section, a work table having hydraulic cylinders.

In this particular embodiment spring 15 is used as a resilient member 15. However, rubber 17 is used as a resilient member 15 in FIG. 7, and urethane foam 18 is used as a resilient member 15 in FIG. 8. Also, a hydraulic or air cylinder 19 is used as a resilient member 15 in FIG. 9. Any other resilient material and device appropriate for the purpose can be used.

The operation of the welding apparatus of FIG. 1 is described below.

Figure 2:
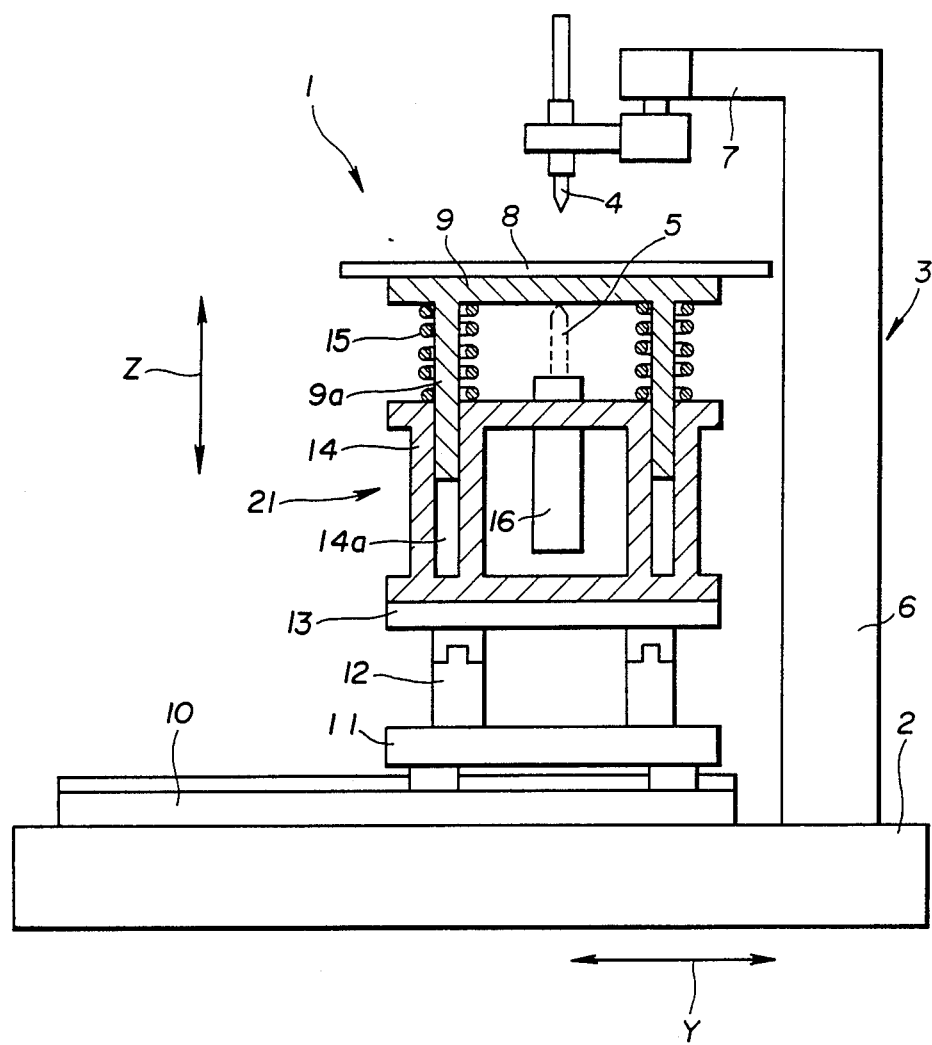
FIG. 2 is a similar view, but showing the state in which the primary positioning is finished.

First, as shown in FIG. 1 or 4, the lower electrode 5 is set at a desired level R at which required welding is effected. Then, the lift cylinder 16 is actuated to support the work table 9, and a work 8 is put on the work table 9. Then the work 8 is at a level P higher than the desired level R. The work 8 is moved to a given point in the X-Y plane. As described above, the work 8 is at a level P higher than the desired level R, and therefore, the work 8 can be freely moved in the X-Y plane without striking against the lower electrode 5. FIG. 2 shows the welding apparatus after finishing the positioning of the work in the X-Y plane. Then, the positioning of the work 8 along the Z-axis is effected. First, the lift cylinder 16 is lowered. Then, the spring 15 is compressed until the resilient force of the spring 15 has balanced the gravity force of the total weight of the work table 9 and the work 8. The resilient force of the spring 15 is so selected that the spring 15 is yieldingly compressed by the total weight of the work table 9 and the work 8 to allow the work to come down to an intermediate level Q between the initial level P and the desired level R in the balancing condition between the spring 15 and the work table 9 plus the work 8. The welding apparatus in the condition is shown in FIGS. 2 and 4.

Figure 3:
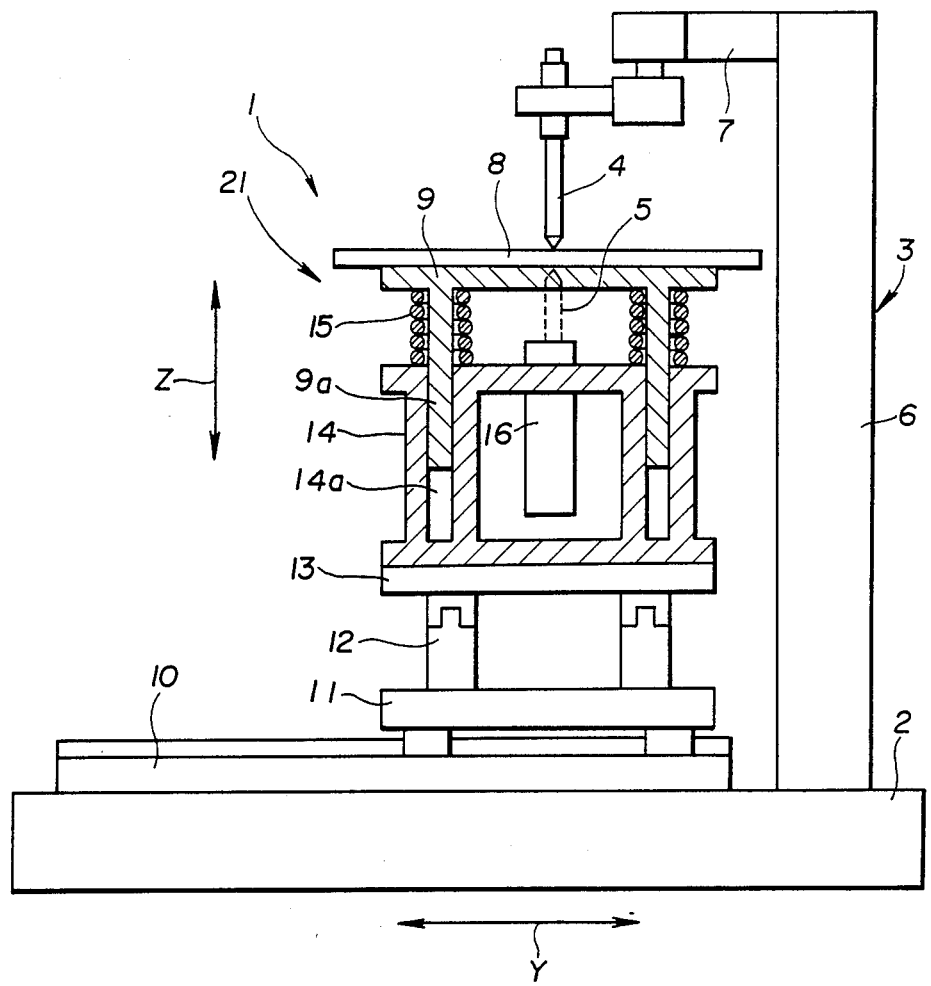
FIG. 3 is a similar view, but showing the state in which the secondary or final positioning is finished.

Next, the upper electrode 4 is lowered as shown in FIGS. 3 and 4. Then, the work 8 is lowered to reduce the difference between the intermediate level Q and the desired level R, that is (R-Q) to zero. Thanks to the spring 15 this fine adjustment or secondary and final positioning is effected precisely, and then the work 8 is held exactly at the desired level R. As is apparent from the above, the work can be set easily and exactly at the desired level without recourse to such a high-level techiques as required in the prior art.

Figure 5:
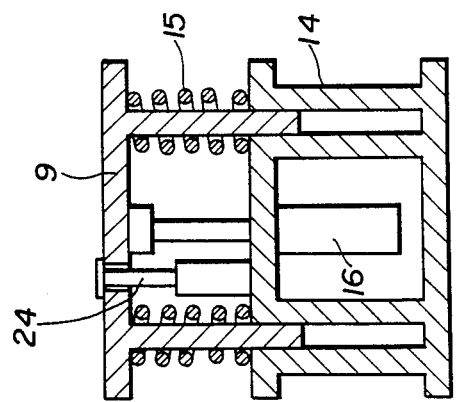
FIG. 5 shows, in section, a work table equipped with a pull-down cylinder.

It should be noted that the work 8 with the upper electrode 4 kept in contact therewith is brought to the desired level. Therefore, the welding apparatus according to the present invention is guaranteed free of any trouble such as a misalignment between the work and the electrode and a deformation of the work, which would be caused if, first, the work were held at the desired level and if, second, the upper electrodes were lowered to contact the work already held at the desired level R, as is the case with the prior art. Therefore, the work is free of poor welding due to inadequate contact between the electrodes and the work, or free of welding at a wrong place due to misalignment between the electrodes and the work. As shown in FIG. 5, a pull-down cylinder 24 may be provided to the work table 9 for lowering a work 8 from the intermediate level Q to the desired level R without recourse to the upper electrode 4 as a pusher. In case that a very thin work is welded or in case that a work whose stiffness is less than that of the spring 15 is welded, deformation of the work 8 or poor contact between the work 8 and the upper electrode 4 may be caused when the work is lowered down to the desired level R with the upper electrode put on the work table. Such deformation or poor contact cannot be avoided simply by using the spring 15. In this connection it is necessary to pull down the work table 9 to the desired level R in place of pushing down the work 8 and the work table 9 with the upper electrode 4.

Figure 6:
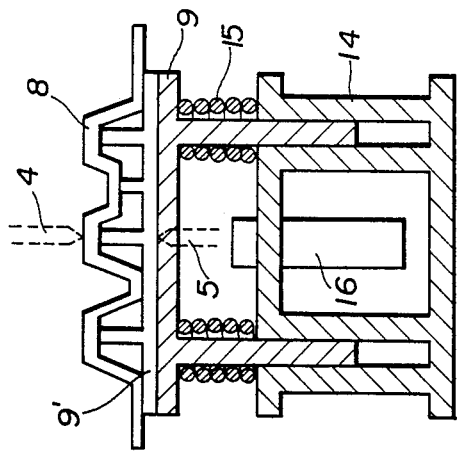
FIG. 6 shows, in section, a work table equipped with an electrically conductive work support, which has upright sticks arranged for supporting a wavy work.

Also, as shown in FIG. 6, a wavy work support 9' of an electrically conductive material may be laid on the work table 9. The wavy work support 9' has sticks arranged to fit a particular hill-and-valley shape of the work 8. Thanks to the use of the wavy work support 9' it is unnecessary to repeat raising the work table 9 to a higher level to avoid any collision between the work 8 and the lower electrode 5 every time welding is effected at a selected level in the work 8, thereby improving the efficiency with which required weldings are effected on the hill-and-valley surface of the work. Required weldings can be effected simply by raising and lowering the upper electrode 4 only.

In this particular embodiment springs are used as resilient means 15 but rubber 17, urethane foam 18 or hydraulic or air cylinder 19 may be equally used.

The welding apparatus as shown and described above is equipped with means for positioning a work at a given point in the X-Y plane in addition to means for putting the work at a given level along the Z-aixs. A welding apparatus according to the present invention, however, can be equipped with means for putting a work at a given level along the Z-axis only.

Figure 10:
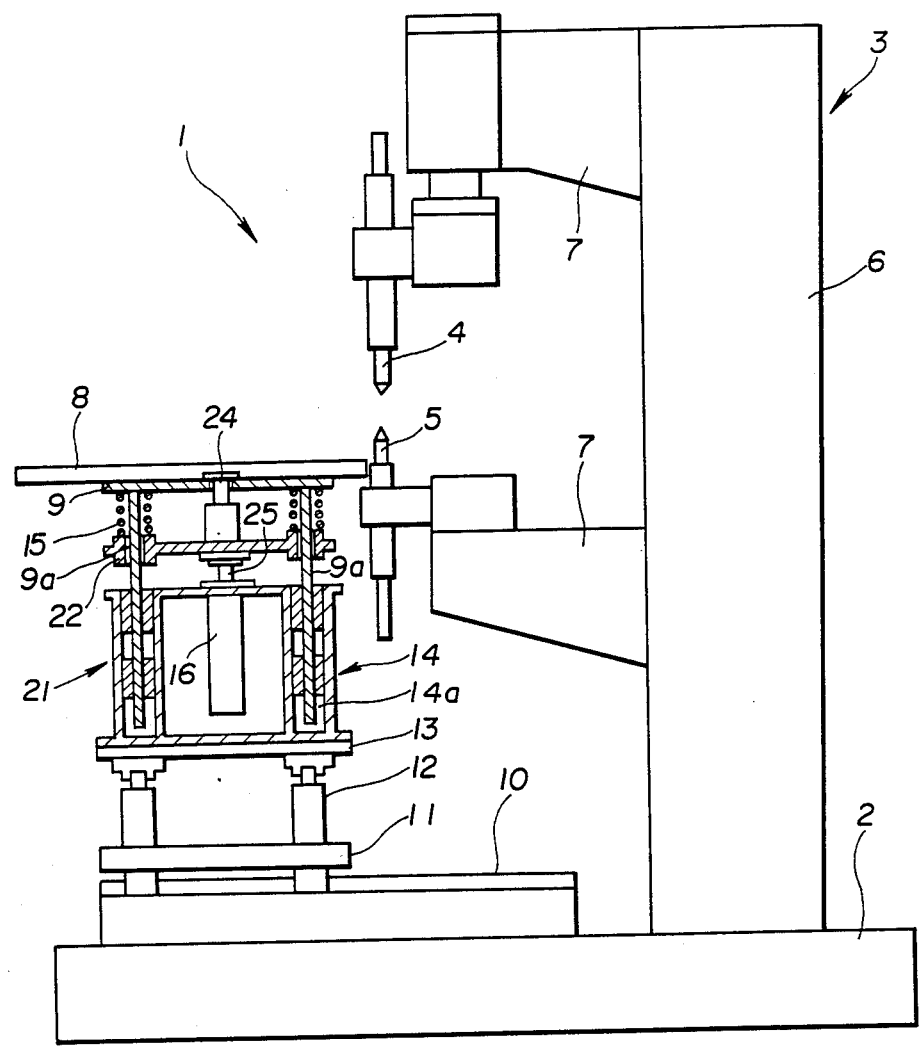
FIG. 10 is a side view of a welding apparatus according to the second embodiment of the present invention, showing the state in which the vertical positioning is not started.
Figure 11:
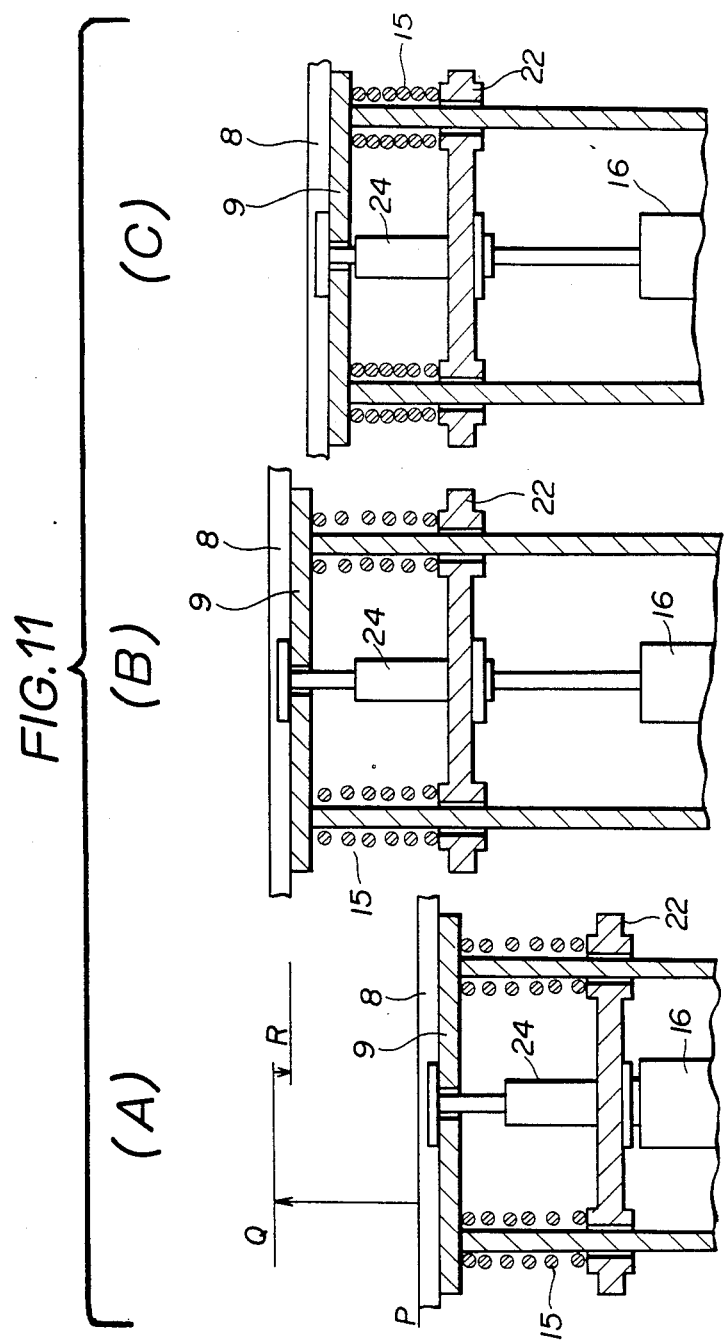
FIG. 11 shows the work table in conditions prior to positioning, at the intermediate positioning and the final positioning respectively, showing how the work table change in height.
Figure 12:
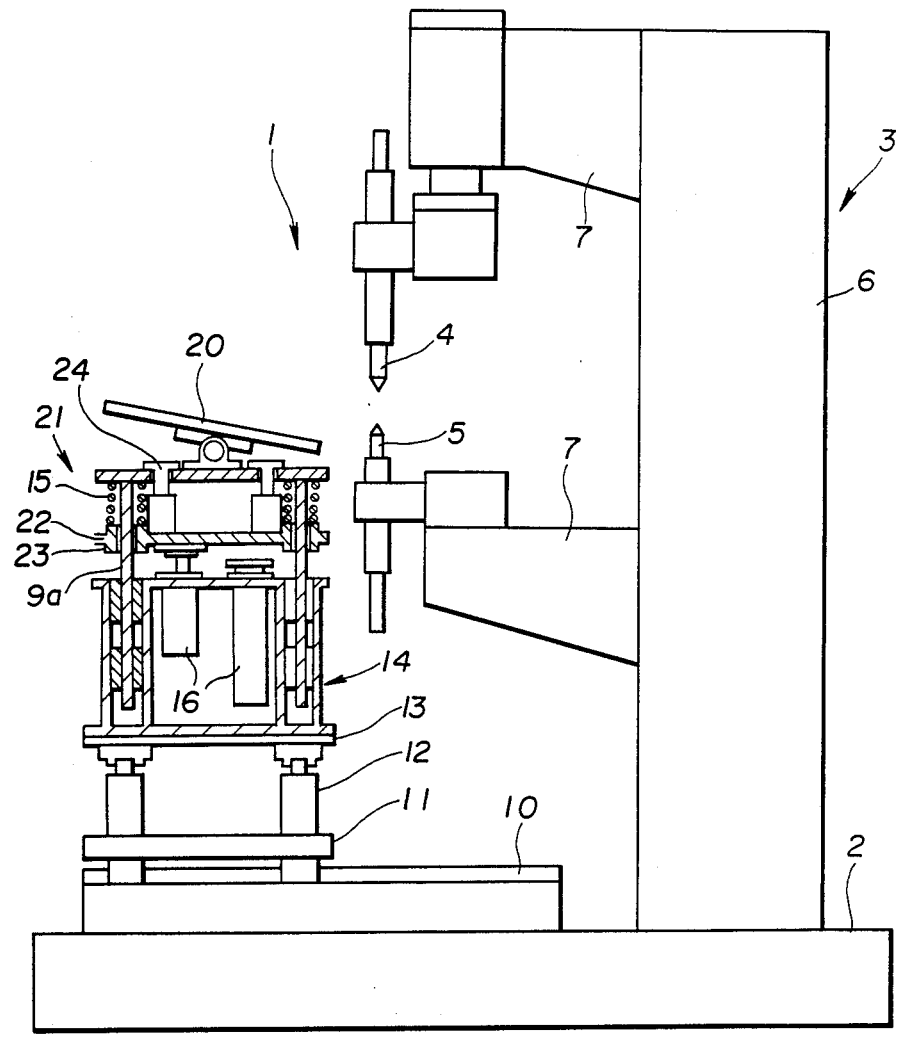
FIG. 12 is a side view of a welding apparatus according to the third embodiment of the present invention.

A welding apparatus according to a second embodiment of the present invention is shown in FIG. 10 to 12. This welding apparatus is different from the first embodiment of FIG. 1 only in that: it uses means 21 for setting a work 8 at a given level along the Z-axis, which means comprises a lift cylinder 16, a lift plate 22 to be lifted by the lift cylinder 16 and springs 15 for transmitting the move of the lift cylinder 16 to the work table 9. The lift cylinder 16 is capable of raising the work 8 to a level Q higher than the desired level R where the springs 15 allows the work B to descend from the higher level Q to the desired level R, thereby permitting fine level adjustment of the work 8.

As shown, the lift plate 22 has a cylindrical holes 23 made in alignment with the cylindrical holes 14a of the work table supporting unit 14 for accepting the legs 9a of the work table 9. The cylindrical holes 14a of the work table supporting unit 14 have guide pads 24 pushed therein. These guide pads 24 hold the legs 9a of the work table 9 stable, still allowing these legs 9a to move up and down without friction, thus causing no hindrance to the lift of the work table 9 by the lift cylinder 16.

The work 8 is raised by the lift cylinder 16 and held at the level Q higher than the desired level R. It is lowered down to the desired level R by pushing the work 8 with the upper electrode 4 against the resilient force of the spring 15. If the work 8 is thin or easy to bend or deform, the work will yieldingly bend, and as a result the force which is applied to the work 8, cannot be transmitted to the spring 15. Therefore, the final positioning of the work 8 at the desired level will be impossible. Also, there is a fear of deforming the work, or of scratching the surface of the work. For solving these problems a pull-down cylinder 24 is used.

This pull-down cylinder 24 may be used in case that the work is thick or stiff.

If the difference between a higher level Q and a desired level R is larger than the maximum difference between the pre-compression height and the post-compression height of the spring, the final positioning of the work at the desired level R cannot be effected by pushing the work with the upper electrode against the resilient force of the spring, and hence welding cannot be effected on the work.

In this connection it is necessary to raise the work 8 above the desired level R within the maximum compression range of the spring. In order to permit final positioning of the work at a selected desired level, use is made of a single lift cylinder 16 whose piston 25 can extend a variable distance, or use are made of a plurality of lift cylinders designed for different strokes, as shown in FIG. 12. A work support 20 which can be inclined at a desired angle, may be detachably fixed to the work table 9 to facilitate welding at an inclined position.

As already described, rubber, urethanefoam and hydraulic or air cylinder may be used as a resilient means 15 in this embodiment.

Now the operation of the welding apparatus according to the second embodiment is described. It is different from the operation of the first embodiment only in that: the lift cylinder 16 extends its piston 25 to raise the lift plate 22 connected to the piston 25, the work table 9 resiliently supported by the lift plate 22 and the work 8 laid on the work table 8, all together. Then, the work 8 is raised and held at a level Q higher than a desired level R within the maximum compression range of the spring 15. Specifically, as shown in FIG. 11 [A], the work 8 is at a level P before the lift cylinder 16 is operated, and as shown in FIG. 11 [B], the work 8 is tentatively raised and held at a higher level Q. As shown in FIG. 11 [C], the work 8 is lowered down to a desired level R by pushing the work 8 with the upper electrode 4 against the resilient force of the spring 15 if the work is thick or stiff enough. The difference between the level Q and the level R is set within the maximum compression range of the spring 15, and therefore, the work 8 can be lowered down to the desired level R, reducing the difference, Q-R, to zero before the spring is compressed to its limit. If the desired level R is changed, the final positioning of the work may be similarly effected.

If a work 8 is easy to bend or deform, the pull-down cylinder 24 may be used to lower the work table 9 and the work 8 together by compressing the spring in place of pusing the work 8 directly with the upper electrode 4.

As in apparent from the above, in the first and third inventions a work can be set precisely at a desired level at which required welding is effected, without recourse to any high-level technical art. The proposed method and apparatus are easy to be carried out or operated, still assuring perfect welding.

The work is brought to the desired level while compressing the spring, thus permitting a soft positioning of the work at the desired level and therefore, preventing chattering between the work surface and the counter electrode, and wearing of the lower electrode. These are likely to be caused if the work and the electrodes knock together. Thanks to the soft positioning the electrodes will not deviate from a desired point at which required welding is to be effected in the work. Thus, exact welding is assured.

As for the second and fourth invention, in addition to the advantages as described above, they advantageously facilitate the fixing of a lift cylinder in the space between the lift plate and the work table.

As for the fifth invention, no matter what physical characteristics or shape a work may have, the work can be positioned at a desired level without causing any deformation in the work or misalignment between the work and the electrodes.

In case that a work is thin or easy to bend or deform, the pull-down cylinder may be used to lower the work table and the work together to a desired level in place of pushing the work down with the upper electrode, thus permitting the work to be put exactly at the desired position without causing any flaws or deformation in the work, and accordinly assuring of satisfactory welding.

What is claimed is:

1. A welding method for welding a work to be welded on a table at an adjusted level between an upper and lower electrodes of a welding set on a base, comprising the steps of:
    placing the work on said table and lowering said table vertically to a first position by the use of the force of gravity;
    lowering the work and the upper electrode together vertically to a second position at which the lower electrode is positioned and which is vertically lower than first position; and
    performing required welding on the work.

2. A welding apparatus which comprises:
    a base;
    a welding set having a movable upper electrode and a stationary lower electrode;
    a work table for supporting a work to be welded; and
    means for positioning the work on the work table at a given level, said work positioning means a spring for supporting the work table and said spring having a primary capability of positioning the work somewhat above the desired level R, never permitting the work to descend below the desired level R, when the spring is yieldingly compressed to balance the weight of the work and a secondary capability of allowing the work to descend to the desired position as high as the stationary lower electrode when extra force is applied to the spring, thus permitting a fine level adjustment of the work.

3. A welding apparatus which comprises:
    a base;
    a welding set having a movable upper electrode and a stationary lower electrode;
    a work table for supporting a work to be welded; and
    means for positioning the work on the work table at a given level, said work positioning means comprising a spring for supporting the work table a lift cylinder and a lift plate operatively connected both to the lift cylinder and to the spring for transmitting the vertical move of the lift plate to the work table, said lift cylinder having a primary capability of positioning the work at a level Q above the desired level R, and said spring on the lift plate having a secondary capability of allowing the work to descent from the level Q to the desired level R as high as the stationary lower electrode, thus permitting a fine level adjustment of the work.

4. A welding apparatus according to claim 3 wherein said lift cylinder permits the work to stay at a level above the desired level R by a height less than the maximum contraction of the spring.

5. A welding apparatus which comprises:
    a base;
    a welding set having movable upper electrode and stationary lower electrode;
    a work table for supporting a work to be welded; and
    means for positioning the work 8 on the work table at a given level, said work positioning means comprising a spring for supporting the work table, a lift cylinder and a lift plate operatively connected both to the lift cylinder and to the spring for transmitting the vertical movement of the lift plate to the work table, said lift cylinder having a primary capability of positioning the work at a level Q above the desired level R, and said work positioning means further comprising a pulling-down cylinder having a secondary capability of allowing the work to descend from the said level Q to the desired level R as high as the stationary lower electrode by pulling down the work table against the spring, thereby permitting a fine level adjustment of the work.

* * * * *